(12) United States Patent
Gilman et al.

(10) Patent No.: US 6,856,427 B1
(45) Date of Patent: Feb. 15, 2005

(54) SYSTEM FOR PRINTING CORRECT EXPOSURE IN A RENDERED DIGITAL IMAGE

(75) Inventors: Paul B. Gilman, Penfield, NY (US); Kenneth A. Parulski, Rochester, NY (US); Kevin E. Spaulding, Spencerport, NY (US); Robert P. Collette, Pavilion, NY (US); John F. Hamilton, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/315,646

(22) Filed: May 20, 1999

(51) Int. Cl.[7] ............. G06F 15/00; H04N 1/40; G06K 9/00
(52) U.S. Cl. ............ 358/1.9; 358/446; 382/100; 382/274
(58) Field of Search ............... 358/1.15, 1.17, 358/1.9, 1.16, 446; 382/100, 254; 345/618, 636; 348/576

(56) References Cited

U.S. PATENT DOCUMENTS

| | | | |
|---|---|---|---|
| 4,754,332 A | * | 6/1988 | Bergquist ............ 348/576 |
| 5,642,204 A | * | 6/1997 | Wang ............... 358/455 |
| 5,717,838 A | | 2/1998 | LeClair |
| 5,834,754 A | | 11/1998 | Feng et al. |
| 5,926,281 A | | 7/1999 | Rioland et al. |
| 6,181,880 B1 | * | 1/2001 | Ishihara et al. ........ 396/321 |
| 6,195,513 B1 | * | 2/2001 | Nihei et al. ........... 396/332 |
| 6,283,653 B1 | * | 9/2001 | Higuchi ............. 400/582 |
| 6,317,221 B1 | | 11/2001 | Aikawa et al. |
| 6,335,742 B1 | | 1/2002 | Takemoto |
| 6,345,128 B1 | * | 2/2002 | Stokes .............. 382/254 |
| 6,356,357 B1 | * | 3/2002 | Anderson et al. ....... 358/1.17 |
| 6,469,805 B1 | * | 10/2002 | Behlok ............. 358/1.9 |
| 6,473,535 B1 | | 10/2002 | Takaoka |

FOREIGN PATENT DOCUMENTS

EP 0 441 609 4/1996

OTHER PUBLICATIONS

U.S. Appl. No. 09/315,648, filed May 20, 1999, Gilman et al.
U.S. Appl. No. 09/315,278, filed May 20, 1999, Gilman et al.
Delmar's Dictionary of Digital Printing and Publishing, Frank J. Romano, Editor, copyright 1997, pp. 234–235.

* cited by examiner

Primary Examiner—Kimberly Williams
Assistant Examiner—Saeid Ebrahimi
(74) Attorney, Agent, or Firm—Raymond L. Owens (57) ABSTRACT

A method for correcting for exposure in a digital image, captured by an image capture device, including rendering such captured digital image suitable for display and displaying such captured digital image as a first displayed digital image; and using an adjustable exposure setting to nonlinearly modify the rendered captured digital image to effect an exposure change and displaying the exposure modified rendered captured digital image as a second digital image simultaneous with the first displayed digital image.

29 Claims, 11 Drawing Sheets

FIG. 9

SYSTEM FOR PRINTING CORRECT EXPOSURE IN A RENDERED DIGITAL IMAGE

CROSS REFERENCE TO RELATED APPLICATIONS

Reference is made to commonly assigned U.S. patent application Ser. No. 09/057,903, filed Apr. 9, 1998, entitled "Transforms for Digital Images" by Hamilton et al, U.S. patent application Ser. No. 09/215,733, filed Dec. 18, 1998, entitled "Correcting Exposure and Tone Scale of Digital Images Captured by an Image Capture Device" by Gilman et al, U.S. patent application Ser. No. 09/315,647 filed May 20, 1999, entitled "Correcting Exposure in a Rendered Digital Image" by Gilman et al, and U.S. patent application Ser. No. 09/315,646 May 20, 1999, entitled "System for Printing Correct Exposure in a Rendered Digital Image" by Gilman et al, the disclosures of which are incorporated herein by reference.

FIELD OF THE INVENTION

The present invention relates to a method for correcting for exposure in rendered digital images captured by a digital camera or the like, which corrected images are particularly suitable for printing.

BACKGROUND OF THE INVENTION

Figure 8:
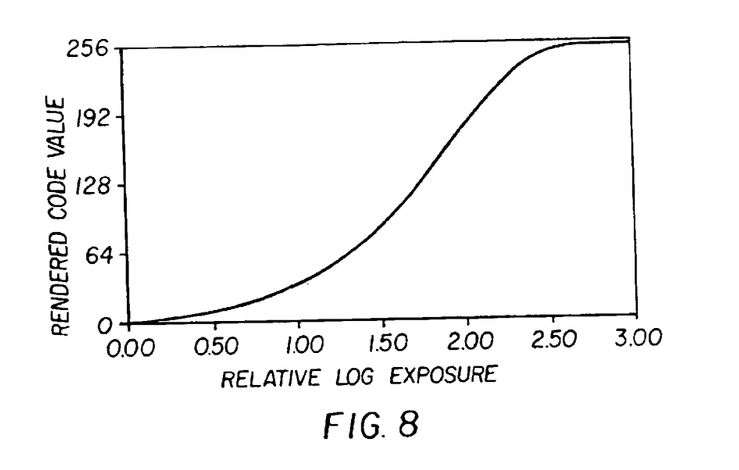
FIG. 8 depicts a possible rendering curve for a rendered digital image.

Digital images which can be captured by scanners or digital cameras, or produced by a computing process, have to be rendered so that they can be properly viewed on a display. The resulting digital images are often referred to as being in a "rendered" image space, such as sRGB, where the relationship between the image code values and the scene luminance values is very non-linear, as depicted in FIG. 8. Digital images, whether obtained from scanned film or from digital cameras, often contain exposure errors, where the key subjects of the picture are lighter or darker than desired by the user, due to imperfect exposure determination algorithms in the digital camera or film scanner which created the digital image. Many imaging applications, such as Adobe Photoshop or Kodak PictureEasy, permit the user to adjust the "brightness", "contrast", and/or "gamma" of the image by sliding using one or more "sliders" controlled by a mouse. Each control adjusts one of the slope, x-intercept, or exponential function applied to the image, typically using a look-up table, in order to modify the tone reproduction of the image when it is displayed or printed. However, because they do not directly adjust the scene exposure, they do not properly compensate for camera exposure errors. While it is possible to somewhat improve the image using such controls, it is extremely difficult for unskilled users to determine how to best set these multiple controls.

Some applications, such as Adobe Photoshop, also permit the user to modify a "lookup table" by inputting a curve of any arbitrary shape. However, only a skilled user is able to determine what curve shape provides the best image, and only then using a tedious trial-and-error process.

SUMMARY OF THE INVENTION

It is an object of the present invention to provide a method that properly compensates for camera exposure errors which is extremely simple for a non-expert to understand and use.

This object is achieved in a method for correcting for exposure in a digital image, captured by an image capture device, comprising the steps of:

(a) rendering such captured digital image suitable for display and displaying such captured digital image as a first displayed digital image; and (b) using an adjustable exposure setting to nonlinearly modify the rendered captured digital image to effect an exposure change and displaying the exposure modified rendered captured digital image as a second digital image simultaneous with the first displayed digital image.

It is an advantage of the present invention that exposure problems can be properly compensated with a minimum of user intervention.

Another advantage of the present invention is that it is extremely simple for a non-expert user to understand and use.

A feature of the invention is that it is particularly suitable for adjusting rendered digital images captured by an image capture device and for causing a printer to make aesthetically pleasing prints of images.

DETAILED DESCRIPTION OF THE INVENTION

Figure 1:
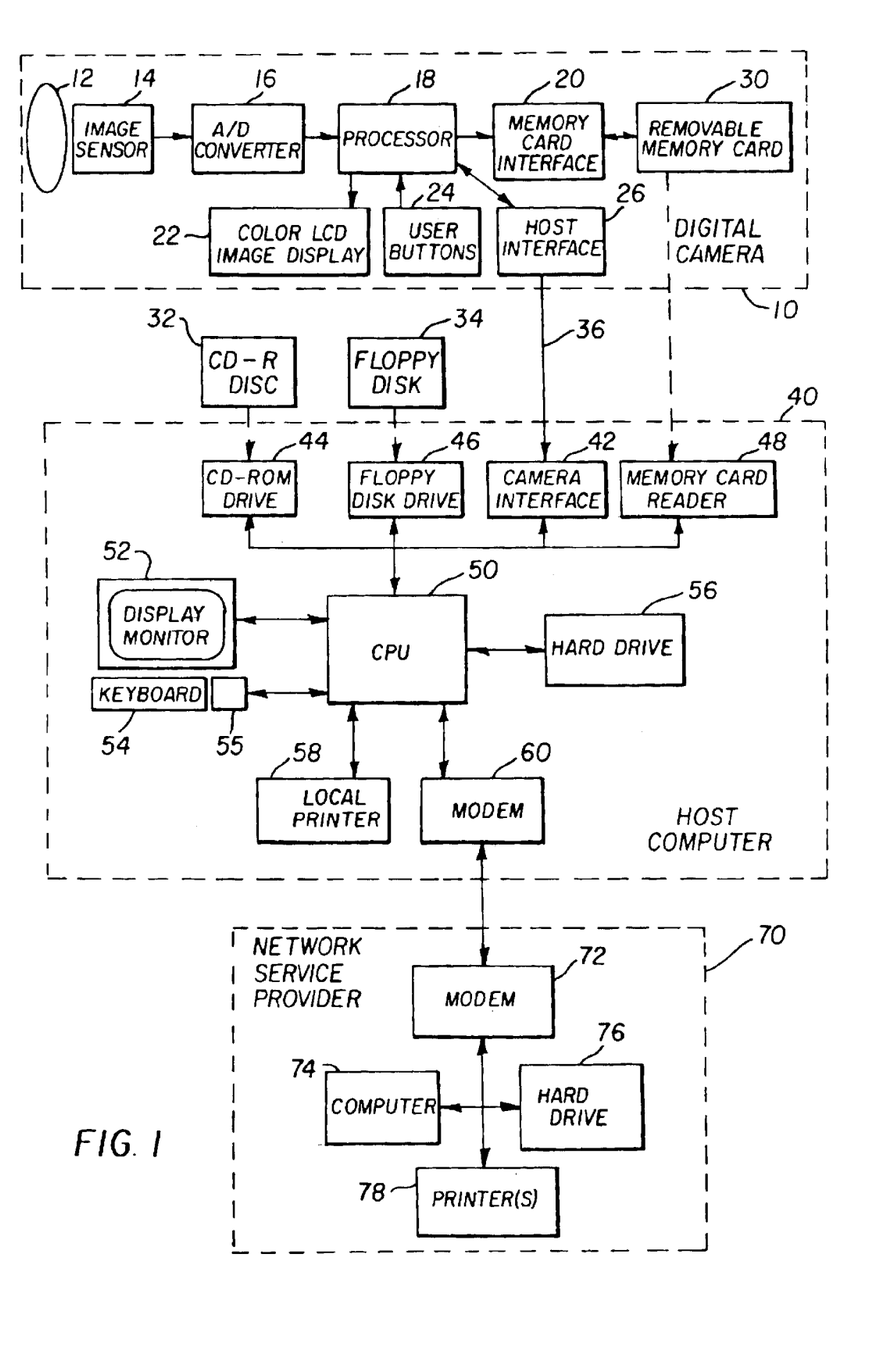
FIG. 1 is a block diagram of a system that can use the method of the present invention.

FIG. 1 is a block diagram of a system that can use the method of the present invention. The system includes a digital image source, such as a digital camera 10 or a film scanning system and digital writing system (not shown) that records digitized film image files on a recordable compact disc (CD-R) 32 or a floppy disk 34. The system also includes a host computer 40 and a networked printing service 70. An imaging application running on the host computer 40 permits a rendered-space image, such as an sRGB color space Exif version 2.1 image file, to be manipulated by a user. The Exif image format is defined in "Digital Still Camera Image File Format Standard, Exchangeable image file format for Digital Still Camera: Exif, JEIDA-49-1998, June 1998 by the Japan Electronics Industries Development Association (JEIDA) and the sRGB color space is described in "A standard default color space for the internet—sRGB by Michael Stokes, et. al., available at http://www.color.org/sRGB.html.

The digital camera 10 produces digital images that are stored on a removable memory card 30. The digital camera 10 includes a lens 12 having an adjustable aperture and shutter (not shown) for focusing light from a scene (not shown) on an image sensor 14, for example a single-chip color CCD image sensor, using the well-known Bayer color filter pattern. The analog output signal from the image sensor 14 is converted to digital data by the A/D converter 16. The digital data is processed by a processor 18, and the processed digital image file is provided to a memory card interface 20 which stores the digital image file on the removable memory card 30. Removable memory cards 30 are know to those skilled in the art. For example, removable memory card 30 can include memory cards adapted to the PCMCIA card interface standard, as described in the *PC Card Standard, Release* 2.0, published by the Personal Computer Memory Card International Association, Sunnyvale, Calif., September 1991. Removable memory card 30 can also be adapted to the Compact Flash interface standard, such as described in the *CompactFlash Specification Version* 1.3, published by the CompactFlash Association, Palo Alto, Calif., Aug. 5, 1998.

The processor performs color interpolation followed by color and tone correction, in order to produce rendered sRGB image data. The rendered sRGB image data is then JPEG compressed and stored as an Exif version 2.1 file on the removable memory card 30. The processor also provides "thumbnail" size image data to a color LCD image display 22, which displays the captured image for the user to review. The camera is controlled by a series of user buttons 24.

After a series of images have been taken and stored on the removable memory card 30, the removable memory card 30 may be inserted into a memory card reader 48 in the computer. Alternately, an interface cable 36 may be used to connect between host interface 26 in the digital camera 10 and the camera interface 42 in the computer 40. The interface cable may conform to, for example, the well know universal serial bus (USB) interface specification.

The images from the digital camera 10 are processed by the computer 40 using enabling software provided on a digital media, such as a CD-R disc 32 or floppy disc 34. Alternately, the enabling software may be downloaded to the computer from a networked printing service 70 via modem 60 and stored on hard drive 56. A CPU 50 uses the software in accordance with the present invention to provide exposure modified rendered digital images, as will be described in more detail in FIGS. 2–6. The CPU 50 is directly coupled to a display monitor 52 and a keyboard 54. A mouse 55 permits the user to readily communicate with the CPU 50. The CPU 50 is in direct communication with a local printer 58, such as an Epson Stylus Photo 700 printer, which produces hard copy prints of the exposure modified rendered digital images.

Alternately, prints may be made at a networked printing service 70 which receives exposure modified rendered digital image files from the host computer 40 using modem 72 and stores the images on local hard drive 76. A computer 74 controls printer(s) 78, which may include, for example, silver halide or dye sublimation printers to print the digital image files, which are then mailed to the user of the host computer 40. The exposure modified rendered digital images may also be e-mailed to other computers (not shown) using modem 60.

Figures 2, 2A:
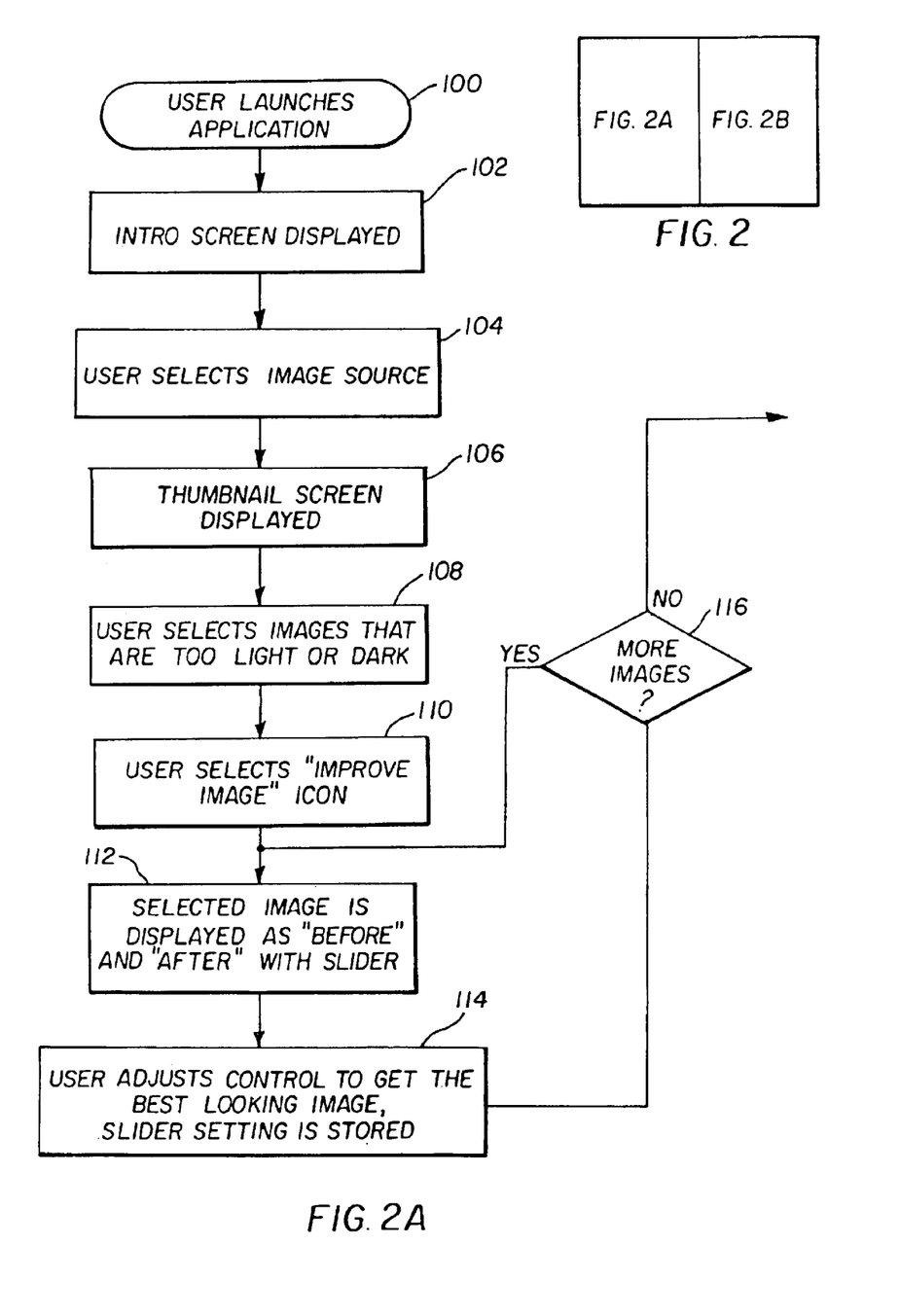
FIG. 2 is a flow diagram of a process for practicing the present invention.
Figure 2B:
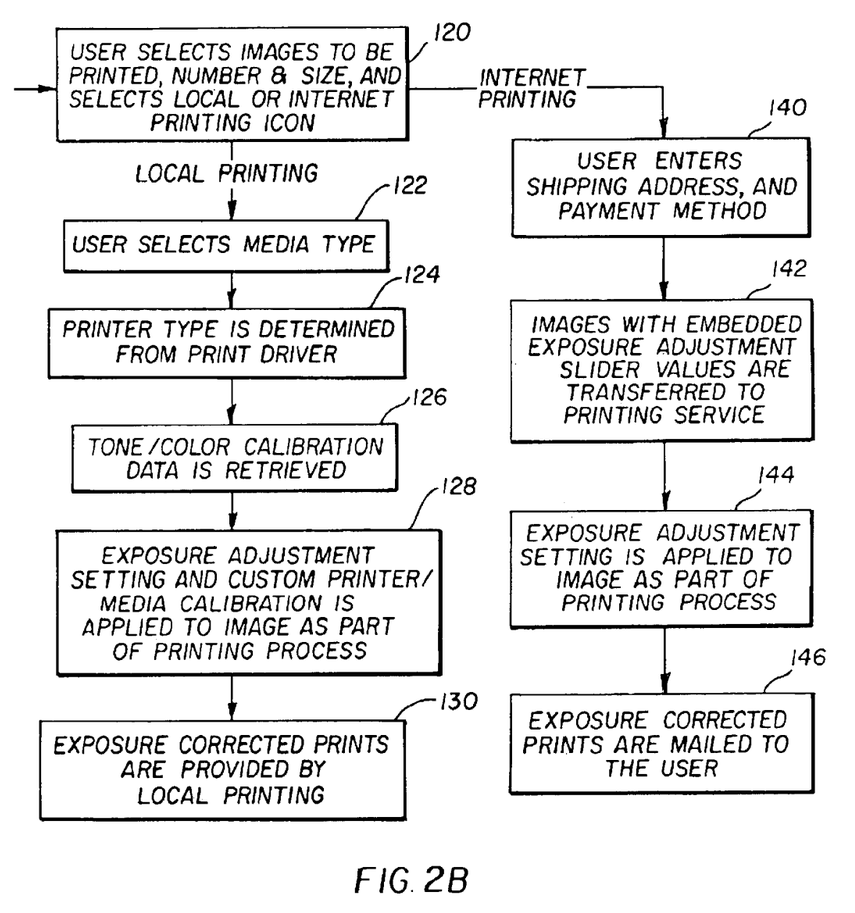

FIG. 2 depicts a block diagram of a process in accordance with the present invention. In step 100, the user of host computer 40 launches the enabling software application. In step 102, the application displays an introduction screen on display monitor 52, which asks the user to select the source of the images. In step 104, the user selects the image source. The image source can be for example the removable memory card 30 in memory card reader 48, digital camera 10 using camera interface 42 (with the camera 10 serving as the memory card reader for removable memory card 30), the floppy disk 34 in floppy disk drive 46, or the CD-R disc 32 in CD-ROM drive 44. In step 106, images from the image source selected in step 104 are displayed using the thumbnail screen shown in FIG. 3.

Figure 3:
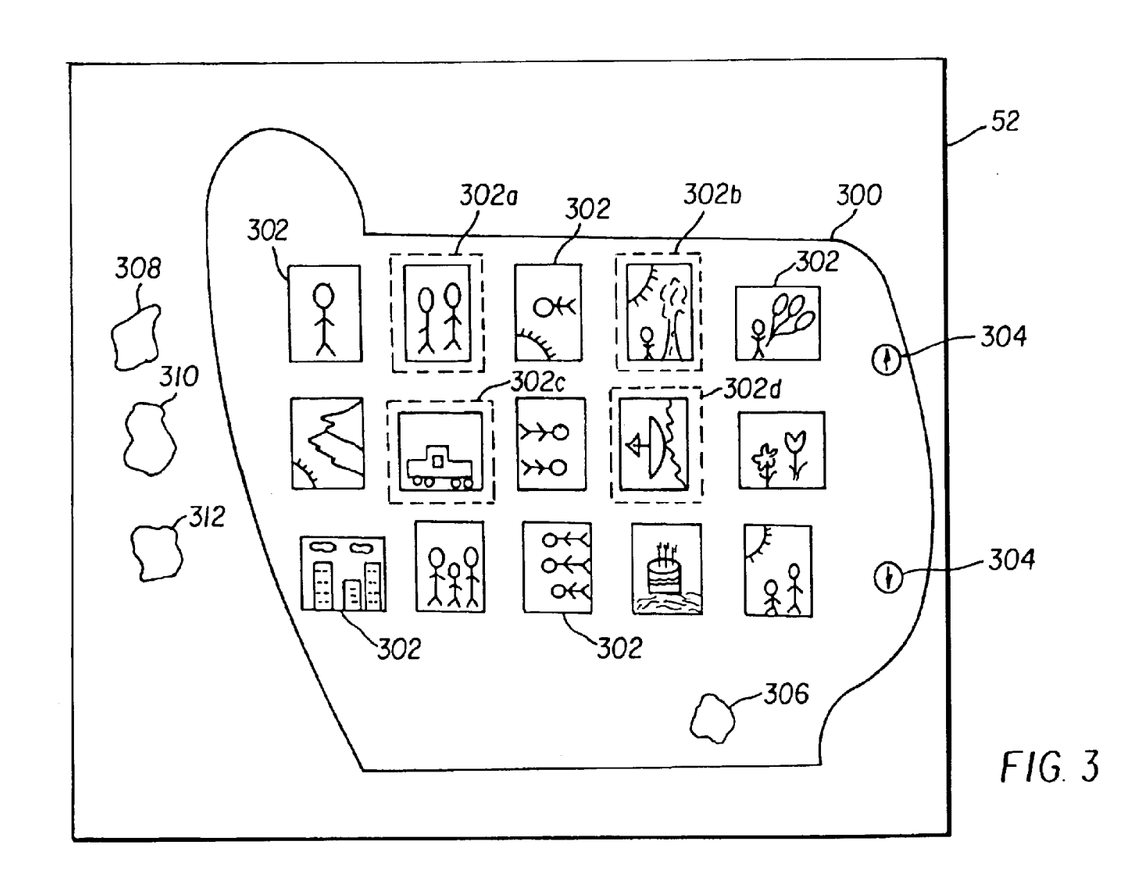
FIG. 3 depicts a thumbnail screen that forms part of the graphical user interface used in the process of FIG. 2.

FIG. 3, which depicts a thumbnail screen that forms part of the graphical user interface displayed on display monitor 52, includes a two-dimensional array of thumbnail images 302 obtained from the image source, such as the removable memory card 30 from digital camera 10. The thumbnail images 302 preferably have a lower resolution than the full size images stored on removable memory card 30. In step 108, the user can select one or more images (e.g. four images) by clicking the mouse 55 on any number of thumbnail images 302. FIG. 3 shows that four thumbnail images 302a, 302b, 302c, and 302d (which are outlined) have been selected. If the removable memory card 30 contains a large number of thumbnail images 302, arrow controls 304 on the right portion of the "preview picture screen" 300 enable the user to scroll through the larger number of thumbnail images 302 to view a group of the thumbnail images 302 (e.g., 15 thumbnail images) at a time.

Adjacent the thumbnail screen 300 is a set of function icons including a "print" icon 308, a "slide show" icon 310, and an "improve image icon" 312. After one or more thumbnail images 302 have been selected in step 108, the user can choose to compensate for camera exposure errors in the selected images 302 by selecting the "improve image" icon 312 in step 110. In step 112, the CPU 50 displays the exposure adjustment screen shown in FIG. 4.

Figure 4:
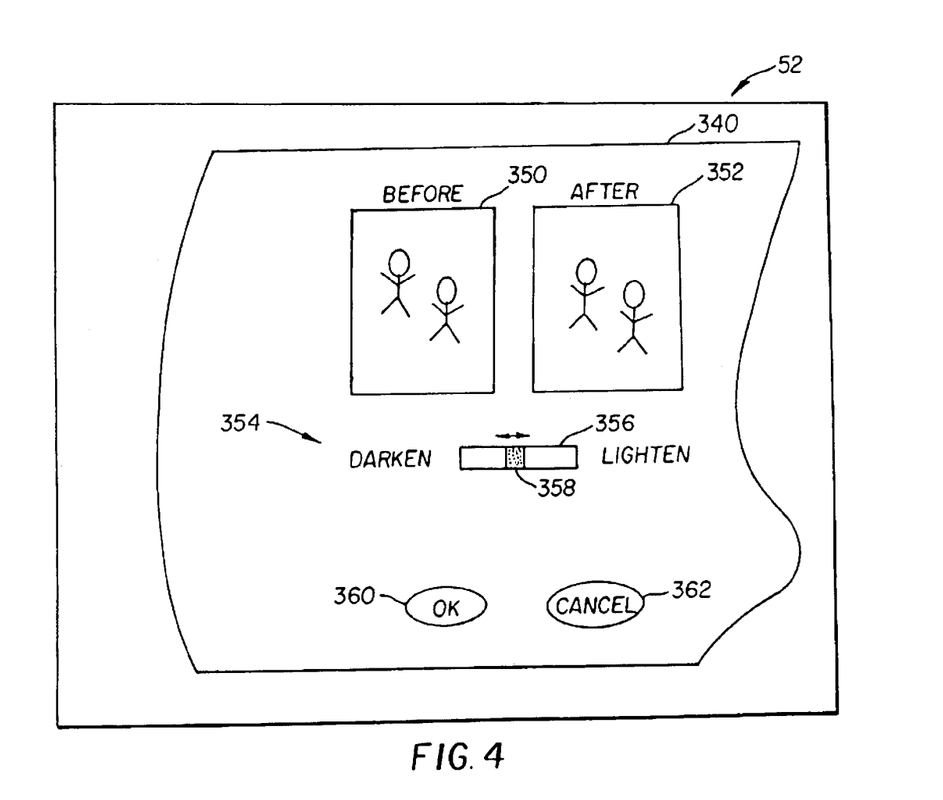
FIG. 4 shows the exposure adjustment screen, incorporating an adjustable exposure setting control, that forms part of the graphical user interface used in the process of FIG. 2.

FIG. 4 depicts the exposure adjustment screen 340 that forms part of the graphical user interface displayed on display monitor 52. The screen includes a "before" correction picture 350, an "after" correction picture 352, and a user adjustable exposure setting interface 354 having a control bar 356 with a user adjustable control position setting 358. When the image to be improved (e.g. image 302a in FIG. 3) is first displayed, the CPU 50 displays the uncorrected image as both the "before" correction image 350 and the "after" correction image 352, and sets the control setting 358 to the middle (e.g. no correction) position.

As the user moves the control setting 358 to the left (towards darken) the image data used to display the "after" correction image is modified using a lookup table implementing a non-linear function that nonlinearly modifies the rendered digital image to effect an exposure change. The non-linear function modifies the digital image to cause the brightness of the highlights, mid-tones, and shadows of the modified digital image look the same as if the camera had provided a lower exposure level to the image sensor when the image was captured by the digital camera 10 or the film camera (not shown), as will be described later in reference to FIGS. 6a–6c. Moving the control setting 358 to the right (towards lighten) causes the image data to be modified using a lookup table that causes the modified digital image to appear as if the camera had provided a correspondingly higher exposure level.

Instead of a control bar 356, the user adjustable exposure setting interface 354 could use one of many other well-known user interface techniques, such as up/down arrows, a box for entering a numeric value, or a radio button selector.

The exposure setting provided by exposure setting interface 354 is immediately applied to the low resolution data that provides the "after" correction image 352 on the computer screen. The user views the uncorrected image in the "before" correction image 350 and the "after" correction image 352, and iteratively adjusts control setting 358 until "after" correction image 352 appears to have the proper brightness level for the scene. When the user is satisfied with the setting, the "OK" icon 360 is selected, and control setting 358 is stored in step 114. In step 116, if there are more images, the CPU 50 displays the next image selected by the user (e.g. image 302b in FIG. 3) as both the "before" correction image 350 and the "after" correction image 352, and returns the control setting 358 to the middle (e.g. no correction) position. If the user instead selects the "Cancel" button 362, the exposure control setting is not stored, and the display 52 returns to the thumbnail screen shown in FIG. 3. Once the last selected image has been exposure corrected, the thumbnail screen shown in FIG. 3 is displayed, using the stored exposure correction settings to modify the thumbnail image data for each of the exposure corrected images (e.g. 302a, 302b, 302c, and 302d).

Figure 5:
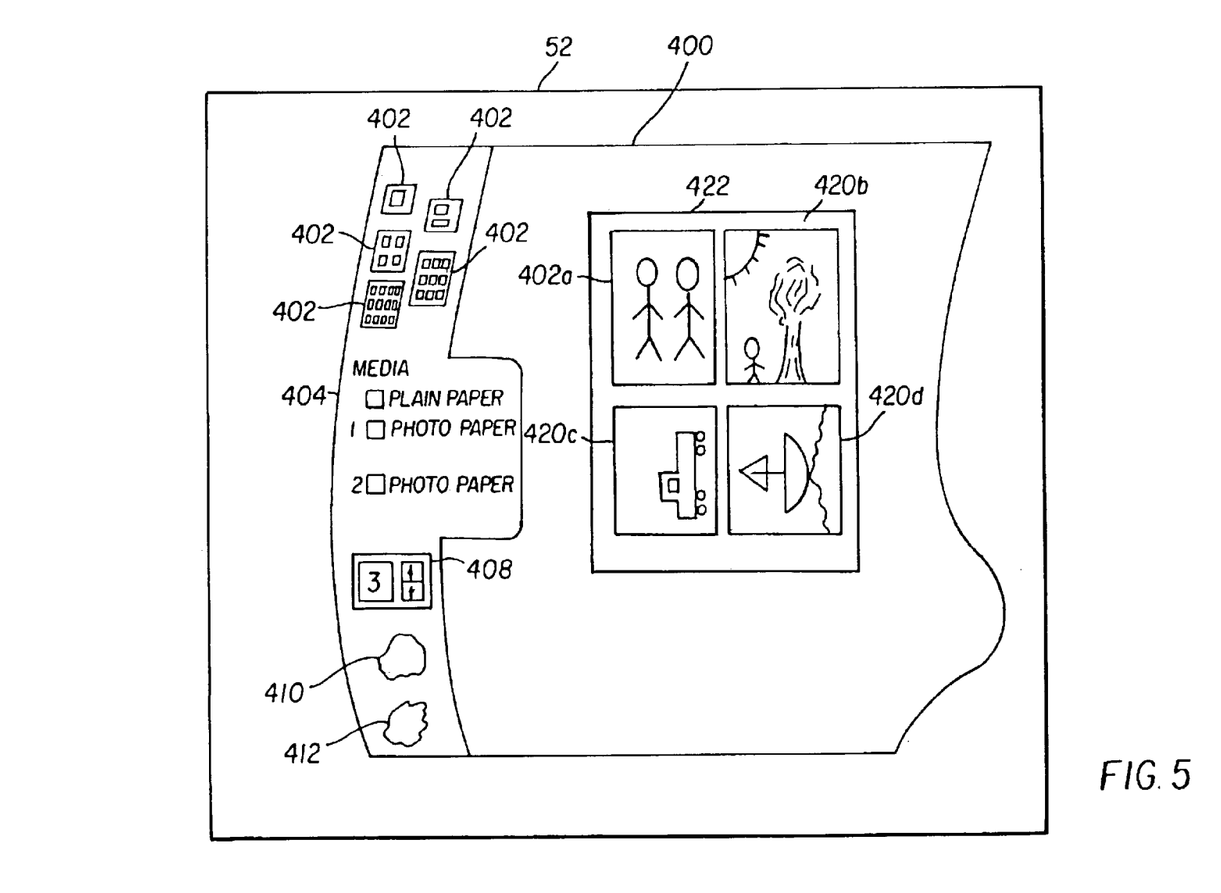
FIG. 5 depicts a screen for selecting printing parameters for a printer.

In step 120, the user selects images to be printed from the thumbnail screen in FIG. 3 by clicking the mouse 55 on any number of thumbnail images 302 or by using the select all images icon 306 and then selects the print icon 308. CPU 50 then displays the printing screen 400 shown in FIG. 5, which forms part of the graphical user interface displayed on display monitor 52. The user then chooses a type of layout using one of several predefined "layout" icons 402 on the periphery of the "print function display screen" 400. The selection determines how many pictures appear on each page by selecting, for example, 1, 2, 4, 9, or 16 images to be printed per page. Once a predefined layout is chosen, the images to be printed appear in a print preview area 422 on the "print function display screen" 400. Based on the number of selected pictures to be printed on a page, the program automatically selects the orientation of the images to best fill up the page. FIG. 5 shows, as an example, four images 420a, 420b, 420c, and 420d, which correspond to the selected thumbnail images 302a, 302b, 302c, and 302d, respectively, shown in FIG. 3.

The user then selects number of sets of images to print, for example, three copies of each laid out page. The selection is made by typing in the number of desired sets in a text field on the left portion of the "number of sets" " control box 408, or by using the up and down arrow keys on the right portion of control box 408.

If a user desires to print the images on a local printer 58, the user selects the media type (e.g. plain paper, Kodak photo paper, or Epson photo paper) 404 in step 122. Finally, the user selects the "local print" icon 410. The user can then walk away from the host computer 40, while each of the selected images is corrected and printed automatically on the local printer 58, without further user interaction. To perform the correction, the type of printer (e.g. Epson Stylus Photo 700) can be automatically determined from the print driver. The printer calibration table for the particular combination of printer and print media selected by the user, provided with the enablement software, is retrieved from the hard drive 56, CD-R disc 32, or floppy disk 34. In step 128, the exposure adjustment and printer/media calibration is performed on the image data to be printed as part of the printing process, as will be described later in reference to FIGS. 6a–6c and FIGS. 7a–7b. In step 130, this corrected data is used by the local printer 58 to produce exposure corrected prints.

Alternately, in step 120 the user may select the internet printing service (e.g. "print at Kodak") icon 412. In step 140, the user enters their credit card number and shipping address using a screen (not shown). In step 142, the images and the associated exposure adjustment values for any exposure corrected images are sent using modem 60 in the host computer 40 to modem 72 at the printing service provider 70 where they are stored together on hard drive 76. In step 144, the exposure adjustment is performed on the image data to be printed, as part of the printing process, as will be described later in reference to FIGS. 6a–6c. In step 146, exposure corrected prints are mailed to the user.

A camera's exposure setting is determined by the lens f/number and shutter exposure time used when capturing an image. For some types of scenes, for example a picture of a person with the sun or bright sky in the background, the camera may provide too little exposure to the image sensor, as a result of an exposure determination error. The exposure adjustment screen 340, described earlier in reference to FIG. 3, permits a non-expert user to interactively adjust an image to appear lighter or darker. This compensates for exposure determination errors which occurred when the original image was taken with a digital camera 10 or when film was exposed and scanned to create digital images on a CD-R disc 32 or floppy disk 34. The resulting exposure corrected digital image is aesthetically pleasing, and has the same tone reproduction as would have been provided had the proper exposure level been used when the image was captured or digitized.

FIG. 8 depicts an example of the relationship between the logarithm of the scene luminance values and the output code values for a typical digital camera or digitized film source, such as PictureCD. This demonstrates one possible rendering curve for a rendered (e.g. sRGB) digital image. This curve can be defined as a rendering transform:

$$CV = T_{log}(\text{Log } L) \quad \text{equation} \quad 1$$

where CV is the rendered code value, L is the scene luminance, and $T_{log}$ is the rendering transform.

Due to the non-linear nature of the rendering transform $T_{log}$, it is not possible to correct for exposure errors in such a rendered digital image by simply adjusting the rendered code values using a function of the form:

$$CV' = 255 * (A + B * (CV/255)^D) \quad \text{equation} \quad 2$$

where CV is the uncorrected sRGB code value, CV' is the corrected sRGB code value, A is an offset (e.g. brightness) correction value, B is a gain (e.g. contrast) correction value, and D is a exponential (e.g. gamma) value.

To properly correct for exposure errors, it is desirable to determine what the original relative scene luminance or scene log luminance values were.

This can be done, for example, by:
(1) Converting the rendered code values back to scene log luminance values using an equation of the form:

$$\text{Log } E = T_{log}^{-1}(CV) \quad \text{equation} \quad 3$$

where $T^{-1}(\ )$ is the inverse of the rendering transform T
(2) Adding an exposure Offset to the scene log luminance values $$\text{Log } E' = \text{Log } E + \text{Offset} \quad \text{equation} \quad 4$$

where Offset is the exposure correction offset
(3) Re-rendering the corrected Log E' value using the rendering transform $$CV' = T_{log}(\text{Log } E') = T_{log}(T_{log}^{-1}(CV) + \text{Offset}) \quad \text{equation} \quad 5$$

Alternately, similar equations could be formulated for a rendering function $T_{lin}$ having as input linear scene luminance values rather than log scene luminance values. In this case, the exposure correction is accomplished by multiplying the linear scene luminance values by a Gain correction value, as shown by:

$$CV' = T_{lin}(T_{lin}^{-1}(CV)*Gain) \quad \text{equation 6}$$

Steps (1) through (3) can be combined into a single equation or implemented using a single lookup table derived for a particular exposure correction setting.

Figure 6A:
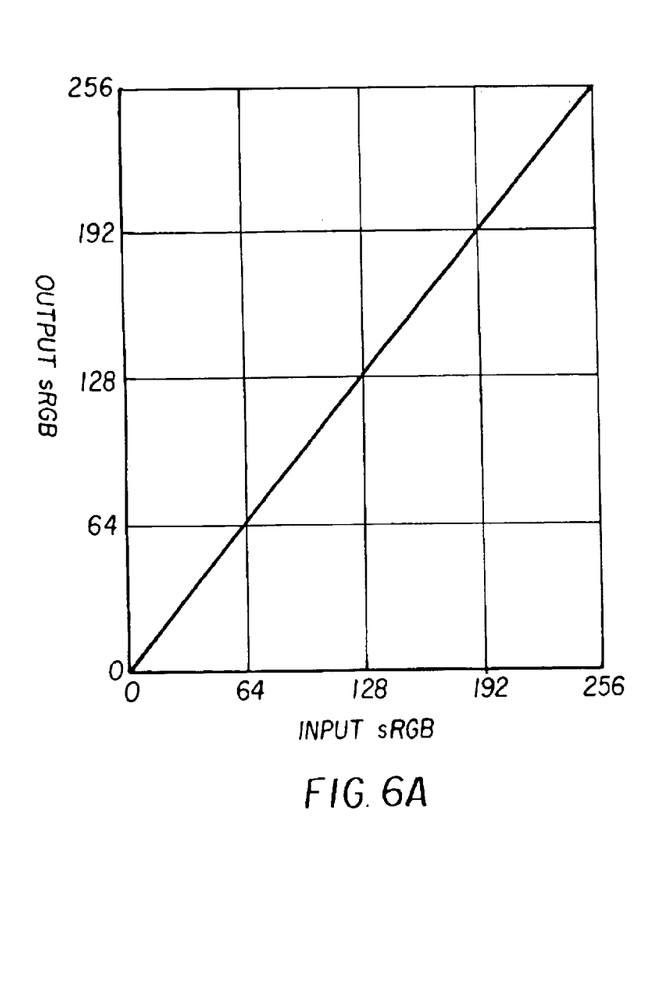
FIGS. 6a–6c depict correction curve shapes produced by different positions of the adjustable exposure setting depicted in FIG. 4.
Figure 6B:
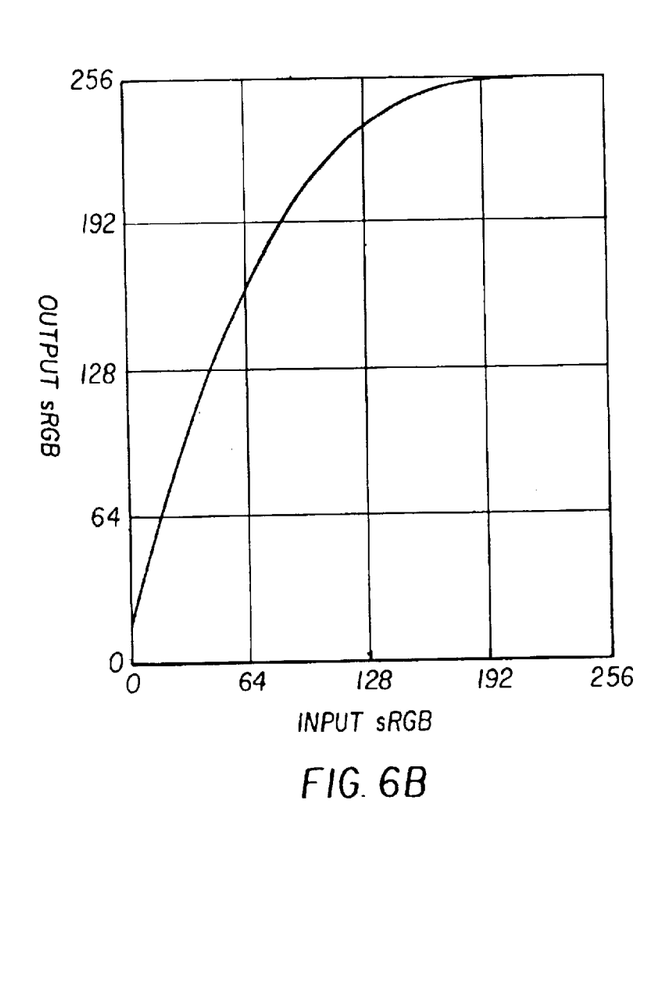
Figure 6C:
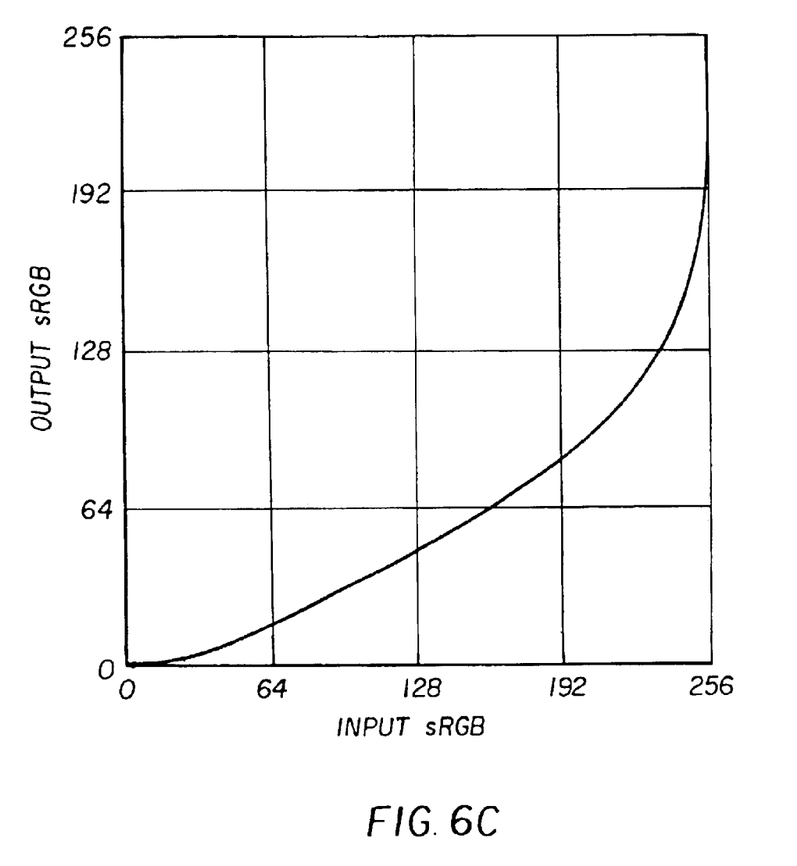

FIGS. 6a–6c depict three different exposure modification curve shapes corresponding to three different exposure setting values. FIG. 6a, shows an exposure setting value of 0, corresponding to no correction. In this case, since the Offset value=0 in equation 5, the output code values are equal to the input code values. The 0 setting is the initial setting for the adjustable control position setting 358 in FIG. 4, and causes the initial "after" correction picture 352 be identical with the "before" correction picture 350, before the user adjusts the user adjustable control position setting 358.

FIG. 6b shows the exposure correction curve shape for an exposure shift of +2 stops. When this lookup table is applied to the image data used for the "before" correction image 350, it causes the "after" correction image 352 to appear as if the camera used to capture the image (e.g. digital camera 10) had provided 2 stops more exposure (e.g. a 4× increase in exposure time) to the image sensor 14 when the image was captured. FIG. 6c shows the exposure correction curve shape for an exposure shift of −2 stops. When this lookup table is applied to the image data used for the "before" correction image 350, it causes the "after" correction image 352 to appear as if, for example, the digital camera 10 had provided 2 stops less exposure (e.g. ¼ the actual exposure time) to the image sensor 14 when this image was captured.

For example, the table below shows an example of rendered code values for three different camera exposure levels for a gray scale test chart with 6 neutral patches corresponding to the example rendering transform depicted in FIG. 8. The column labeled "density" provides the density values of each test patch, where:

$$\text{Density} = -\log(\text{reflectance}) \quad \text{equation 7}$$

The column labeled "CV normal exposure" provides the rendered code values when the sensor was properly exposed when the image was captured. In this case, no exposure correction is required. The column labeled "CV −2 stops exposure" provides the rendered code values when the sensor was underexposed by 2 stops when the image was captured. In this case, the exposure correction curve shape shown in FIG. 6b can be used to modify the rendered code values in order to perform exposure correction to obtain corrected code values similar to those shown in the "CV normal exposure" column. The curve depicted in FIG. 6b was calculated using equation 5 with an offset value of +0.6 log luminance units, in order to correct for the −2 stops exposure error.

The column labeled "CV+2 stops exposure" provides the rendered code values when the sensor was overexposed by 2 stops when the image was captured. In this case, the exposure correction curve shape shown in FIG. 6c can used to modify the rendered code values, in order to perform exposure correction to obtain corrected code values similar to those shown in the "CV normal exposure" column. However, since the upper code values (e.g. the White and Neutral 8 patches) are clipped to the maximum 255 code value, it will be impossible to recover proper code values for these low density patches. The curve depicted in FIG. 6c was calculated using equation 5 with an offset value of −0.6 log luminance units, in order to correct for the +2 stops exposure error.

| Patch | Density | CV normal exposure | CV −2 stops exposure | CV +2 stops exposure |
|---|---|---|---|---|
| White | 0.05 | 244 | 147 | 255 |
| Neutral 8 | 0.23 | 224 | 112 | 255 |
| Neutral 6.5 | 0.44 | 186 | 79 | 253 |
| Neutral 5 | 0.70 | 136 | 50 | 239 |
| Neutral 3.5 | 1.05 | 79 | 27 | 186 |
| Black | 1.50 | 33 | 4 | 97 |

Figure 7A:
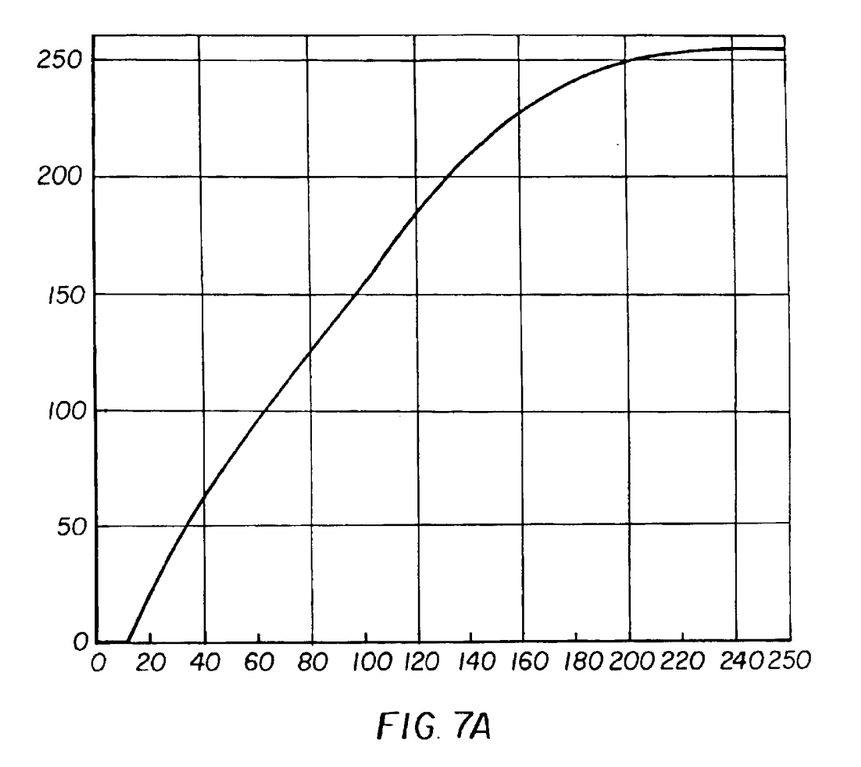
FIGS. 7a–7b depict two tone correction curve shapes for use with two different types of printers and print media combinations.
Figure 7B:
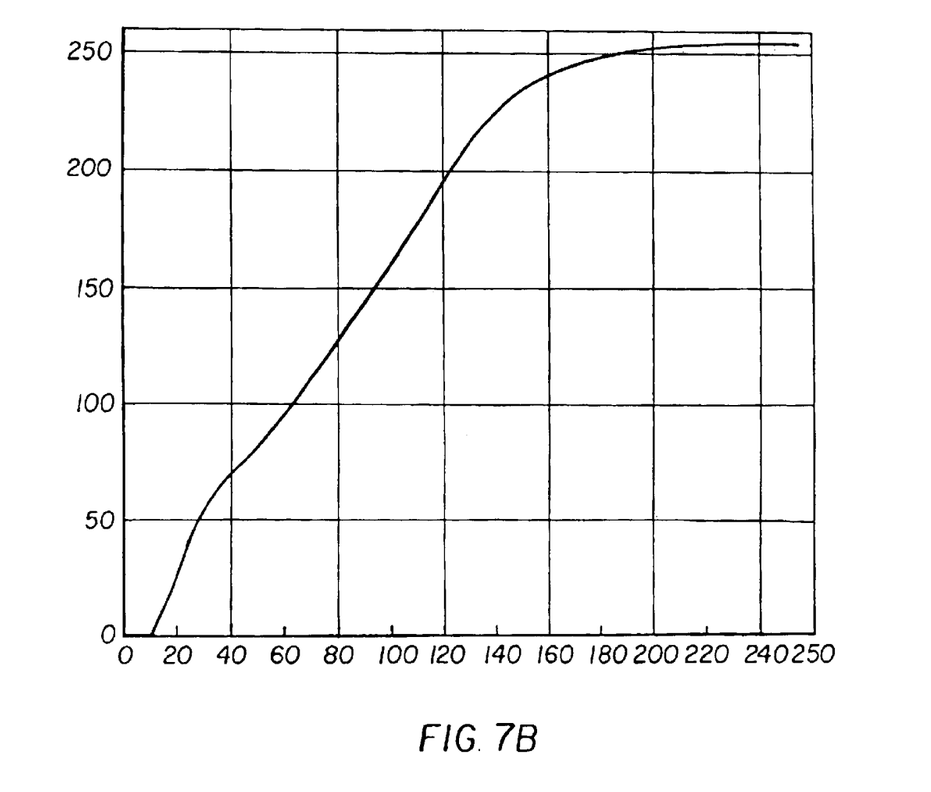

FIGS. 7a–7b depict two different printing correction curve shapes which are customized for the combination of print media selected in step 122 and printer determined in step 124. FIG. 7a, shows the printing correction curve shape for an Epson color photo stylus 700 printer with Canon ink jet media. FIG. 7b shows the printing correction curveshape for an Epson color photo stylus 700 printer with Kodak ink jet printer. The curve shape compensates for the differences in code value to density response of the printers onto the different media.

The exposure correction described in relation to FIGS. 6a–6c and the printing correction described in relation to FIGS. 7a–7b can be implemented as part of the printing process (e.g. step 128) by first applying the exposure correction to the uncorrected full resolution sRGB image using a first lookup table, and then using the output of this first lookup table as the input to a second lookup table which performs the printing correction. Preferably, these two lookup tables are combined into a single lookup table by mapping each input code value through table 1 to the corresponding output of table 2. Using a single lookup table to perform both functions reduces the time required to process the full resolution image data.

In an alternate embodiment, exposure adjustment is immediately applied to the full resolution image data, rather than being stored (as in step 114) and applied at a later step in the processing (step 128). In this embodiment, the exposure correction is immediately applied to compensate for imperfect exposure in the original scene, and the exposure-corrected image is stored. This full resolution exposure-corrected image can later be displayed, e-mailed, or printed. When the image is printed, a custom tone reproduction correction curve shape is used to compensate for the combination of the printer and media, in order to improve the quality of the prints provided by the printer.

Figure 9:
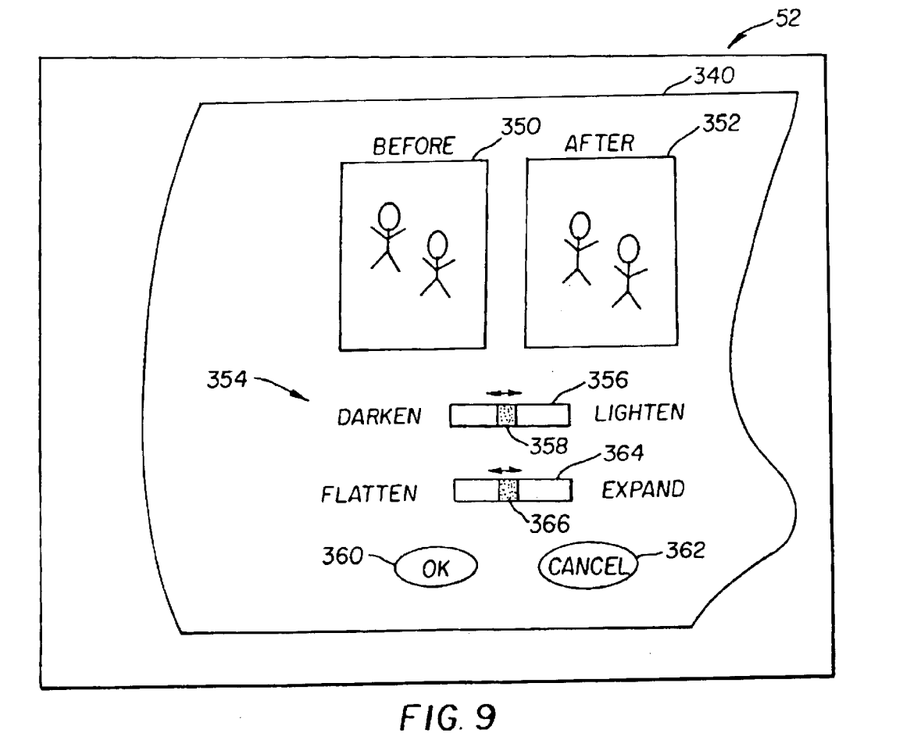
FIG. 9 shows an alternate embodiment of the exposure adjustment screen, incorporating an adjustable exposure setting control and a scene contrast setting control.

In another alternate embodiment, the user interface includes, in addition to the exposure setting adjustment, a scene contrast adjustment, as depicted in FIG. 9. The scene contrast adjustment is useful to provide a preferred contrast setting for certain types of scenes (e.g. flat-looking scenes). In this embodiment, the exposure adjustment screen 340 provides a user adjustable exposure setting interface 354 including both an exposure level control bar 356 with a user adjustable exposure level control setting 358, and a contrast level control bar 364 with a user adjustable contrast level control setting 366. When the image to be improved (e.g. image 302a in FIG. 3) is first displayed, the CPU 50 displays the uncorrected image as both the "before" correction image 350 and the "after" correction image 352, and sets both exposure level control setting 358 and contrast level control setting 366 to the middle (e.g. no correction) position.

As the user moves the contrast level control setting 366 to the left (towards flatten) the image data used to display the "after" correction image is modified using a lookup table implementing a non-linear function that nonlinearly modifies the rendered digital image to effect an exposure-space decrease in contrast. Moving the contrast level control setting 366 to the right (towards expand) causes the image data to be modified using a lookup table that nonlinearly modifies the rendered digital image to effect an exposure-space increase in contrast. The exposure level control setting 358 provides the same exposure adjustments described earlier in relation to FIG. 4. Instead of control bars 356 and 364, the user adjustable exposure setting interface 354 could use one of many other well-known user interface techniques, such as up/down arrows, a box for entering a numeric value, or a radio button selector.

To provide the scene contrast adjustment, an additional step is inserted after step 4:

$$\text{Log } E'' = \text{Log } Ep + M(\text{Log } E' - \text{Log } Ep) \quad \text{equation 8}$$

where Ep is the pivot point (for example a middle grey corresponding to a 20% scene luminance value) and M is the contrast multiplier.

The exposure corrected and contrast adjusted code values are therefore equal to $$CV'' = T_{log}(\text{Log } E'') \quad \text{equation 9}$$

The contrast function in equation 7 can be replaced by other types of contrast functions, for example the contrast function described in above-cited commonly-assigned U.S. patent application Ser. No. 09/057,903, incorporated by reference herein.

The invention has been described in detail with particular reference to certain preferred embodiments thereof, but it will be understood that variations and modifications can be effected within the spirit and scope of the invention.

PARTS LIST

| | |
|---|---|
| 10 | digital camera |
| 12 | lens |
| 14 | image sensor |
| 16 | A/D converter |
| 18 | processor |
| 20 | memory card interface |
| 22 | color LCD image display |
| 24 | user buttons |
| 26 | host interface |
| 30 | removable memory card |
| 32 | CD-R disc |
| 34 | floppy disc |
| 36 | interface cable |
| 40 | host computer |
| 42 | camera interface |
| 44 | CD-ROM drive |
| 46 | floppy disc drive |
| 48 | memory card reader |
| 50 | CPU |
| 52 | display monitor\screen |
| 54 | keyboard |
| 55 | mouse |
| 56 | hard drive |
| 58 | local printer |
| 60 | modem |
| 70 | network printing service provider |
| 72 | modem |
| 74 | computer |
| 76 | hard drive |
| 78 | printers |

-continued

PARTS LIST

| | |
|---|---|
| 100 | launch |
| 102 | intro screen |
| 104 | select image source |
| 106 | display thumbnail screen |
| 108 | select images |
| 110 | select image icon |
| 112 | display selected image |
| 114 | user adjusts control |
| 116 | more images |
| 120 | select printing options |
| 122 | select media type |
| 124 | determine printer type |
| 126 | retrieve calibration data |
| 128 | apply exposure adjustment |
| 130 | print images |
| 140 | enter shipping info |
| 142 | transfer images |
| 144 | apply exposure adjustment |
| 146 | mail images |
| 300 | preview picture screen |
| 302 | thumbnail images |
| 302a | first selected thumbnail image |
| 302b | second selected thumbnail image |
| 302c | third selected thumbnail image |
| 302d | fourth selected thumbnail image |
| 304 | arrow controls |
| 306 | select all icon |
| 308 | print icon |
| 310 | slide show icon |
| 312 | improve image icon |
| 340 | exposure adjustment screen |
| 350 | "before" correction picture |
| 352 | "after" correction picture |
| 354 | exposure setting interface |
| 356 | exposure level control bar |
| 358 | exposure level control setting |
| 360 | OK icon |
| 362 | Cancel icon |
| 364 | contrast level control bar |
| 366 | contrast level control setting |
| 400 | print function display screen |
| 402 | layout icons |
| 404 | media selection menu |
| 408 | copies selection menu |
| 410 | local printing icon |
| 412 | network printing icon |
| 420a | image |
| 420b | image |
| 420c | image |
| 420d | image |
| 422 | print preview area |

What is claimed is:

1. A digital image system for changing exposure in a digital image having an exposure level and for causing a printer to produce a print, comprising:

means for storing a plurality of rendered digital images;

means for selecting one of such rendered digital images, and displaying such digital image;

adjustable exposure setting means for modifying the selected rendered digital image using an exposure modification curve selected responsive to a single user adjustable exposure setting with the exposure modification curve having a curve shape that effectively converts rendered code values back to scene values, adjusts an exposure of the scene values and renders corrected scene values to effect a change which accounts for the rendering and appears as if a different exposure level was used by an image capture device to capture the image and displaying the exposure modified rendered digital image;

means for tone scale adjusting the modified rendered digital image; and means for printing the tone scale adjusted digital image.

2. The digital image system of claim 1 further including:

means for selecting a print media setting from a plurality of settings; and wherein the means for tone scale adjusting provides a plurality of tone scale adjustments corresponding to the plurality of print media settings.

3. The digital image system of claim 2 further including:

means for automatically determining a printer type; and wherein the means for tone scale adjusting provides different tone scale adjustments for different printer types.

4. A digital image system for changing exposure in a digital image having an exposure level and for causing a printer to produce a print, comprising:

means for storing a plurality of rendered digital images;

means for selecting one of such rendered digital images and displaying such selected rendered digital image;

adjustable exposure setting means which in accordance with an exposure modification function, selected responsive to a single user adjustable exposure setting, for modifying the selected rendered digital image with the exposure modification function having a shape that effectively converts rendered code values back to scene values, adjusts an exposure of the scene values and renders corrected scene values to effect a change which accounts for the rendering and appears as if a different exposure level was used by an image capture device to capture the image and displaying the exposure modified rendered digital image;

means for iteratively changing the adjustable exposure setting and selecting a corresponding nonlinear function to continuously change the apparent exposure level and display modified digital images until a desired exposure modified rendered digital image is displayed;

means for tone scale adjusting the desired exposure modified rendered digital image; and means for printing the tone scale adjusted digital image.

5. The digital image system of claim 4 further including:

means for selecting a print media setting from a plurality of settings; and wherein the means for tone scale adjusting provides a plurality of tone scale adjustments corresponding to the plurality of print media settings.

6. The digital image system of claim 5 further including:

means for automatically determining a printer type; and wherein the means for tone scale adjusting provides different tone scale adjustments for different printer types.

7. A digital image system for changing exposure in a digital image having an exposure level and for causing a printer to produce a print, comprising:

means for rendering such captured digital image suitable for display and displaying such captured digital image as a first displayed digital image;

adjustable exposure setting means for exposure modifying the rendered captured digital image in accordance with a non-linear curve selected in response to a single user adjustable exposure setting with the non-linear curve having a curve shape that effectively converts rendered code values back to scene values, adjusts an exposure of the scene values and renders corrected scene values to effect an exposure change which accounts for the rendering and appears as if a different exposure level was used by an image capture device to capture the image and displaying the exposure modified rendered captured digital image as a second digital image relative to the first displayed digital image;

means for tone scale adjusting the desired exposure modified rendered digital image; and means for printing the tone scale adjusted digital image.

8. The digital image system of claim 7 further including:

means for iteratively changing the adjustable exposure setting and changing the second displayed digital image until a desired exposure modified rendered captured digital image is produced.

9. The digital image system of claim 8 further including:

means for selecting a print media setting from a plurality of settings; and wherein the means for tone scale adjusting provides a plurality of tone scale adjustments corresponding to the plurality of print media settings.

10. The digital image system of claim 9 further including:

means for automatically determining a printer type; and wherein the means for tone scale adjusting provides different tone scale adjustments for different printer types.

11. A digital image system for correcting a digital image having an exposure level and for causing a printer to produce a print, comprising:

means for storing a plurality of rendered digital images;

means for selecting one of such digital images;

means for selecting an exposure modification curve to be used to modify the one of the digital images responsive to a single user adjustable exposure setting and modifying the one of the digital images using the selected exposure modification curve with the selected exposure modification curve having a curve shape that effectively converts rendered code values back to scene values, adjusts an exposure of the scene values and renders corrected scene values to effect a change which accounts for the rendering and appears as if a different exposure level was used by an image capture device to capture the image;

means for tone scale adjusting the one of the digital images including a plurality of tone scale adjustments corresponding to a plurality of print media settings;

means for selecting a print media setting from a plurality of settings; and means for printing the tone scale adjusted digital image.

12. The digital image system of claim 11 further including:

means for automatically determining a printer type; and wherein the means for tone scale adjusting provides different tone scale adjustments for different printer types.

13. A method for changing exposure in a rendered digital image having an exposure level and for causing a printer to produce a print, comprising:

displaying such rendered digital image;

using a single user adjustable exposure setting to select an exposure modification curve used to modify the rendered digital image with the exposure modification curve having a curve shape that effectively converts rendered code values back to scene values, adjusts an exposure of the scene values and renders corrected scene values to effect a change which accounts for the rendering and appears as if a different exposure level was used by an image capture device to capture the image and displaying the exposure modified rendered digital image;

tone scale adjusting the desired exposure modified rendered digital image; and printing the tone scale adjusted digital image.

14. The method of claim 13 further including:

selecting a print media setting from a plurality of settings; and wherein the tone scale adjusting step uses a plurality of tone scale adjustments corresponding to the plurality of print media settings.

15. The method of claim 14 further including:

automatically determining a printer type; and wherein the tone scale adjusting step uses different tone scale adjustments for different printer types.

16. A method for changing a digital image having an exposure level and for causing a printer to produce a print, comprising:

providing a rendered digital image;

selecting a print media setting from a plurality of settings;

modifying the digital image using an exposure modification curve selected responsive to a single user adjustable exposure setting with the exposure modification curve having a curve shape that effectively converts rendered code values back to scene values, adjusts an exposure of the scene values and renders corrected scene values to effect a change which accounts for the rendering and appears as if a different exposure level was used by an image capture device to capture the image;

tone scale adjusting the digital image using the tone scale adjustment corresponding to the selected print media setting from a plurality of tone scale adjustments; and printing the tone scale adjusted digital image.

17. The digital image system of claim 16 further including:

automatically determining a printer type; and wherein the means for tone scale adjusting provides different tone scale adjustments for different printer types.

18. A computer program product comprising a computer readable storage medium having a computer program stored thereon for changing exposure in a rendered digital image having an exposure level, comprising:

displaying such rendered digital image;

using a single user adjustable exposure setting to select an exposure modification curve used to modify the rendered digital image with the exposure modification curve having a curve shape that effectively converts rendered code values back to scene values, adjusts an exposure of the scene values and renders corrected scene values to effect a change which accounts for the rendering and appears as if a different exposure level was used by an image capture device to capture the image and displaying the exposure modified rendered digital image;

tone scale adjusting the desired exposure modified rendered digital image; and printing the tone scale adjusted digital image.

19. A computer program product comprising a computer readable storage medium having a computer program stored thereon for changing exposure in a digital image having an exposure level, comprising:

providing a rendered digital image;

selecting a print media setting from a plurality of settings;

modifying the digital image using an exposure modification curve selected responsive to a single user adjustable exposure setting with the exposure modification curve having a curve shape that effectively converts rendered code values back to scene values, adjusts an exposure of the scene values and renders corrected scene values to effect a change which accounts for the rendering and appears as if a different exposure level was used by an image capture device to capture the image;

tone scale adjusting the digital image using the tone scale adjustment corresponding to the selected print media setting from a plurality of tone scale adjustments; and printing the tone scale adjusted digital image.

20. An apparatus, comprising:

an input/output system displaying a rendered digital image, having a single user adjustable exposure adjustment control and having a tone adjustment control;

a computer connected to the input/output system, selecting an exposure modification curve responsive to the single user adjustable exposure adjustment control and modifying the digital image using the selected exposure modification curve with the exposure modification curve having a curve shape that effectively converts rendered code values back to scene values, adjusts an exposure of the scene values and renders corrected scene values to effect a change which accounts for the rendering and appears as if a different exposure level was used by an image capture device to capture the image, modifying the digital image responsive to changes in the tone adjustment control, and displaying the modified digital image on the input/output system; and a printer connected to the computer and printing the modified digital image.

21. An apparatus, comprising:

an input/output system displaying a rendered digital image, having a single user adjustable exposure adjustment control and having a tone adjustment control;

a computer connected to the input/output system, changing a shape of an exposure modification curve responsive to changes in the exposure adjustment control, modifying the digital image responsive to the shape changed exposure modification curve with the exposure modification curve having a curve shape that effectively converts rendered code values back to scene values, adjusts an exposure of the scene values and renders corrected scene values to effect a change which accounts for the rendering and appears as if a different exposure level was used by an image capture device to capture the image and responsive to changes in the tone adjustment control, and displaying the modified digital image on the input/output system; and a printer connected to the computer and printing the modified digital image.

22. An apparatus, comprising:

an input/output system displaying a rendered digital image, having a single user adjustable exposure adjustment control and having a tone adjustment control;

a computer connected to the input/output system, selecting a shape of an exposure modification curve responsive to changes in the one-dimensional exposure adjustment setting, modifying the digital image responsive to the selected exposure modification curve with the exposure modification curve having a curve shape that effectively converts rendered code values back to scene values, adjusts an exposure of the scene values and renders corrected scene values to effect a change which accounts for the rendering and appears as if a different exposure level was used by an image capture device to capture the image and responsive to changes in the tone adjustment control, and displaying the modified digital image on the input/output system; and a printer connected to the computer and printing the modified digital image.

23. An apparatus, comprising:

an input/output system displaying a rendered digital image, having a single user adjustable exposure adjustment control and having a tone adjustment control;

a computer connected to the input/output system, selecting an exposure modification curve responsive to changes in the exposure adjustment control, modifying the digital image responsive to the selected exposure modification curve with the exposure modification curve having a curve shape that effectively converts rendered code values back to scene values, adjusts an exposure of the scene values and renders corrected scene values to effect a change which accounts for the rendering and appears as if a different exposure level was used by an image capture device to capture the image and responsive to changes in the tone adjustment control, and displaying the modified digital image on the input/output system; and a printer connected to the computer and printing the modified digital image.

24. A method for modifying a digital image captured by an image capture device using a particular exposure level, and for causing a printer to produce a print, comprising:

rendering a digital image from original scene values producing a rendered digital image;

allowing a user to adjust the rendered digital image producing an adjusted digital image with the adjustment having the effect of converting the rendered digital image to scene values, modifying the scene value digital image using an exposure modification curve selected responsive to a single user adjustable exposure setting with the exposure modification curve having a curve shape that effectively converts rendered code values back to scene values, adjusts an exposure of the scene values to effect a change that appears as if a different exposure level was used by an image capture device to capture the image producing a modified scene value digital image, and rendering the modified scene value digital image producing the adjusted digital image; and printing the adjusted digital image.

25. A method as recited in claim 24, wherein the allowing comprises the user selecting the exposure setting and performing a table look-up operation in a single table using rendered digital image values and the exposure setting as table indices.

26. A method for modifying a digital image captured by an image capture device using a particular exposure level, and for causing a printer to produce a print, comprising:

rendering a digital image from original scene values producing a rendered digital image;

allowing a user to adjust the rendered digital image producing an adjusted digital image with the adjustment having the effect of converting the rendered digital image to scene values, modifying the scene value digital image using an exposure modification curve with the exposure modification curve having a curve shape that effectively converts rendered code values back to scene values, adjusts an exposure of the scene values producing a modified scene value digital image, and rendering the modified scene value digital image producing the adjusted digital image; and printing the adjusted digital image.

27. A method as recited in claim 26, wherein the allowing comprises the user selecting the exposure setting and performing a single table look-up operation for each image value using rendered digital image values and the exposure setting as table indices.

28. A method for modifying a digital image captured by an image capture device using a particular exposure level, and for causing a printer to produce a print, comprising:

rendering a digital image from original scene values producing a rendered digital image;

allowing a user to adjust the rendered digital image producing an adjusted digital image with the adjustment effectively converting rendered code values back to scene values, adjusting an exposure of the scene values, producing a modified scene value digital image, and rendering the modified scene value digital image producing the adjusted digital image; and printing the adjusted digital image.

29. A method for modifying a digital image captured by an image capture device using a particular exposure level, and for causing a printer to produce a print, comprising:

rendering a digital image from original scene values producing a rendered digital image;

allowing a user to adjust the rendered digital image producing an adjusted digital image with the adjustment effectively reversing the rendered digital image back to scene values, adjusting an exposure of the scene values and re-rendering the digital image as an adjusted digital image; and printing the adjusted digital image.

* * * * *